(No Model.)
T. McDONALD, Jr.
NUT LOCK.
No. 519,196.  Patented May 1, 1894.
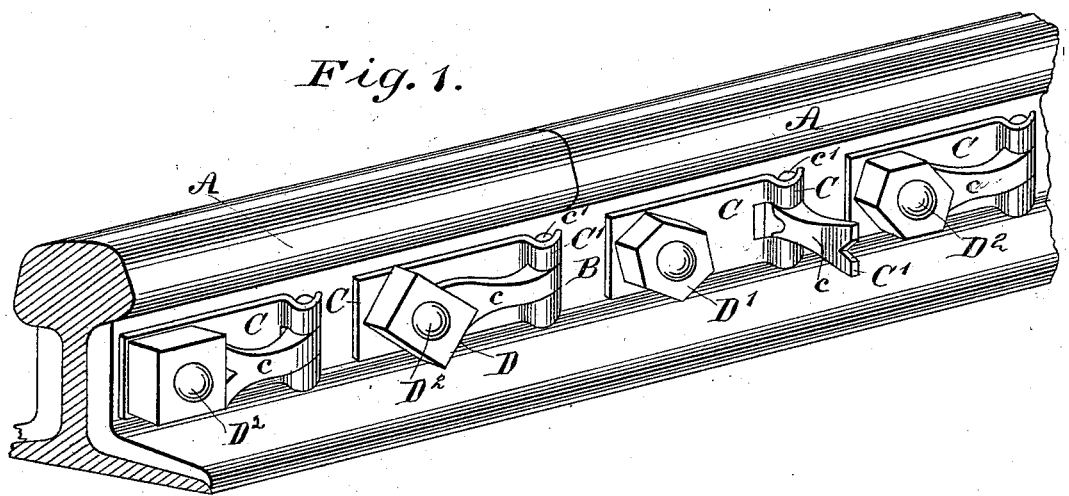
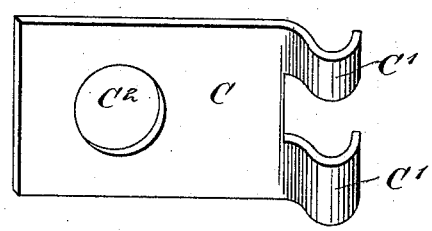
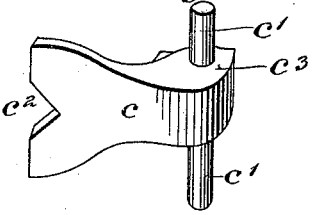
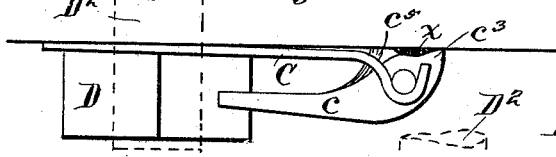
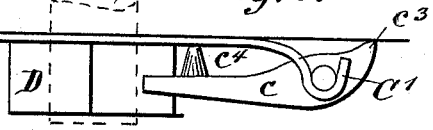
WITNESSES:
M. H. Twitchell.
Wm N. Moore.
INVENTOR
Thomas McDonald Jr.
BY J. H. Stevenson
ATTORNEY.
THE NATIONAL LITHOGRAPHING COMPANY,
WASHINGTON, D. C.

UNITED STATES PATENT OFFICE.

THOMAS McDONALD, JR., OF ALLEGHENY, PENNSYLVANIA.

NUT-LOCK.

SPECIFICATION forming part of Letters Patent No. 519,196, dated May 1, 1894.

Application filed August 26, 1893. Serial No. 484,158. (No model.)

*To all whom it may concern:*

Be it known that I, THOMAS MCDONALD, Jr., a citizen of the United States, residing at Allegheny, in the county of Allegheny and State of Pennsylvania, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is a nut lock the nature of which will be more fully explained hereinafter.

In the accompanying drawings Figure 1 represents two rail road rails on which are several of my nut locks, this figure being in perspective. Fig. 2 is a spring washer. Fig. 3 is the lock proper. Fig. 4 is a side view of my lock in position in connection with the spring washer and nut, and Fig. 5 is a similar view with a modification which will be fully explained hereinafter.

A A are sections of rail road rails.

B is the fish plate.

C is a spring washer, oblong in shape. C' C' are hinge portions of the same. $C^2$ is the bolt opening in the washer.

c is the nut lock proper.

c' c' are integral hinge pins.

$c^2$ is a V shape cut out.

x is a recess to give proper bearing.

D is a square nut; D' a nut of hexagon shape.

$D^2$ is a bolt.

$c^3$ is the heel of the lock c.

$c^4$ is a post or abutment forming an integral part of the nut-lock c.

In Fig. 1 my nut lock is seen properly in position, locking the nut and also one lock out of position. Here it will be seen, that the pins c' and the parts C' of the washer C are made to form a hinge for the lock c, and as the heel $c^3$ projects beyond the line of the pins c', the lock cannot be thrown back without considerable effort, on account of the spring in the washer C, as in doing this the hinge end of the lock has to be raised, hence when once locked, there cannot be an unlocking without using considerable force or power. The heel $c^3$ is provided in Figs. 1, 3 and 4 with the integral post or abutment $c^5$ bearing flat against the fish plate and acting in the same manner and for the same purpose as post or abutment $c^4$. The V shaped cut out of the lock c is thus made so as to lock the nut at any one of the angles thereof or any one of the faces. The function of the post or abutment $c^4$ is to prevent the lock from falling flat on the spring washer. This is shown in Fig. 5.

This invention is a substantial and important modification of my other patent, No. 464,758, issued to me December 8, 1891.

The object of the posts or abutments $c^4$ and $c^5$ of the lock c, is to prevent the lock from falling flat against the washer C as it might get under the nut and hence lose its function. And besides by standing up as shown in Fig. 4, it is an easy matter to insert a lever to pry it up when it is desired to remove or readjust the nut.

Having thus described my invention, what I claim, and desire to secure by Letters Patent of the United States, is—

1. The herein described nut lock, consisting of the spring plate having the bolt openings at one end and the other end bifurcated to form the pivot bearings, the nut locking lever having the hinge pins or pivots and the post or abutment and heel and the notch for engaging the nut.

2. In a nut lock, the combination of the nut and bolt, the spring plate having the open pivot bearings, the locking lever pivoted in said bearings and having the post or abutment.

In testimony whereof I affix my signature in presence of two witnesses.

THOMAS McDONALD, JR.

Witnesses:
P. M. CAREY,
J. K. BARBOUR.